United States Patent [19]

Appeldorn

[11] Patent Number: 4,848,319
[45] Date of Patent: Jul. 18, 1989

[54] REFRACTING SOLAR ENERGY CONCENTRATOR AND THIN FLEXIBLE FRESNEL LENS

[75] Inventor: Roger H. Appeldorn, Grant Township, Washington County, Minn.

[73] Assignee: Minnesota Mining and Manufacturing Company, St. Paul, Minn.

[21] Appl. No.: 283,550

[22] Filed: Dec. 9, 1988

Related U.S. Application Data

[63] Continuation of Ser. No. 169,004, Mar. 16, 1988, abandoned, Continuation-in-part of Ser. No. 774,048, Sep. 9, 1985, abandoned.

[51] Int. Cl.⁴ .................................................. F24J 2/08
[52] U.S. Cl. .................................. 126/440; 126/426; 350/250; 350/501
[58] Field of Search .................. 126/426, 440, 451; 350/501, 411, 436, 452, 250

[56] References Cited

U.S. PATENT DOCUMENTS

| | | | |
|---|---|---|---|
| 3,058,394 | 10/1962 | Edlin | 88/73 |
| 3,125,091 | 3/1964 | Sleeper, Jr. | 126/271 |
| 3,203,306 | 8/1965 | Lefferts | 88/1 |
| 3,985,118 | 10/1976 | Bard | 126/271 |
| 4,011,857 | 3/1977 | Rice | 126/270 |
| 4,022,186 | 5/1977 | Northrup, Jr. | 126/271 |
| 4,069,812 | 1/1978 | O'Neill | 126/271 |
| 4,089,323 | 5/1978 | Trihey | 126/270 |
| 4,111,184 | 9/1978 | Perkins | 126/270 |
| 4,116,223 | 9/1978 | Vasilantone | 126/271 |
| 4,194,949 | 3/1980 | Stark | 202/180 |
| 4,204,881 | 5/1980 | McGrew | 136/89 PC |
| 4,211,211 | 7/1980 | Toomey et al. | 126/439 |
| 4,230,094 | 10/1980 | Szulmayer | 126/439 |
| 4,238,246 | 12/1980 | Genequand et al. | 136/248 |
| 4,270,981 | 6/1981 | Stark | 202/172 |
| 4,289,118 | 9/1981 | Stark | 126/440 |
| 4,297,000 | 10/1981 | Fries | 350/96.24 |
| 4,299,201 | 11/1981 | Tsubota | 126/440 |
| 4,323,052 | 4/1982 | Stark | 126/440 |
| 4,337,759 | 7/1982 | Popovich et al. | 126/438 |
| 4,344,417 | 8/1982 | Malecek | 126/439 |
| 4,347,834 | 9/1982 | York | 126/424 |
| 4,352,350 | 10/1982 | Johnson | 126/425 |
| 4,385,430 | 5/1983 | Bartels | 29/458 |
| 4,456,783 | 6/1984 | Baker | 136/246 |
| 4,545,366 | 10/1985 | O'Neill | 126/440 |

Primary Examiner—Randall L. Green
Attorney, Agent, or Firm—Donald M. Sell; Walter N. Kirn; Stephen W. Buckingham

[57] ABSTRACT

A solar energy concentrator including a thin flexible Fresnel lens for focusing incident solar radiation not normal to the lens onto a target area by refraction. The Fresnel lens is supported or suspended above the target area by a frame and folded along at least one line or region parallel to the refractive prisms of the lens which are generally parallel to the axis of the target area whereby the Fresnel lens opens toward the target area. Thus the Fresnel lens is so positioned so as to allow it to bow and flex under wind loads, gravity and other environmental factors without causing significant deterioration in the efficiency of the system.

5 Claims, 4 Drawing Sheets

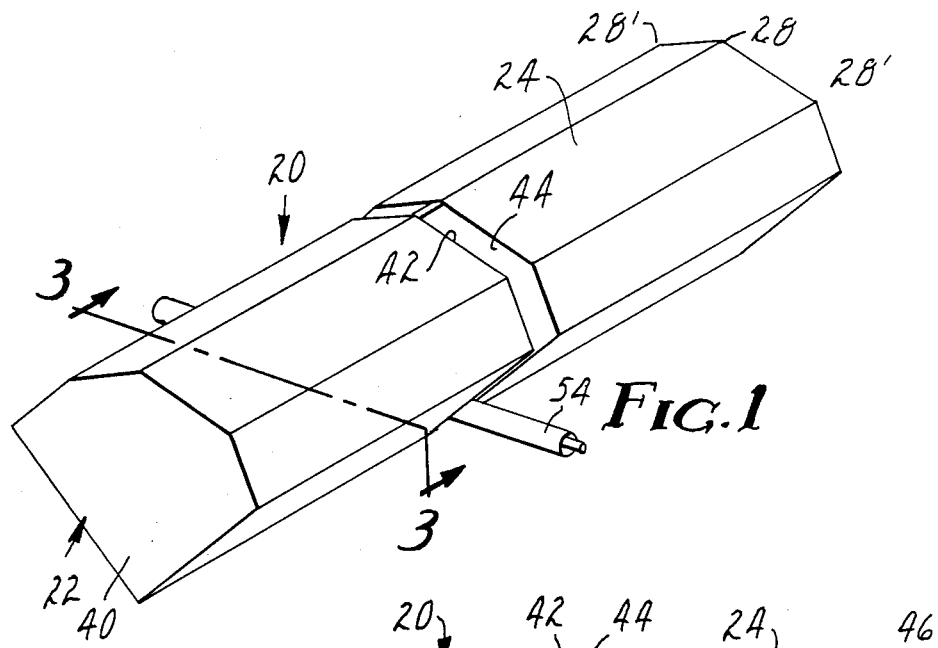
Fig. 1
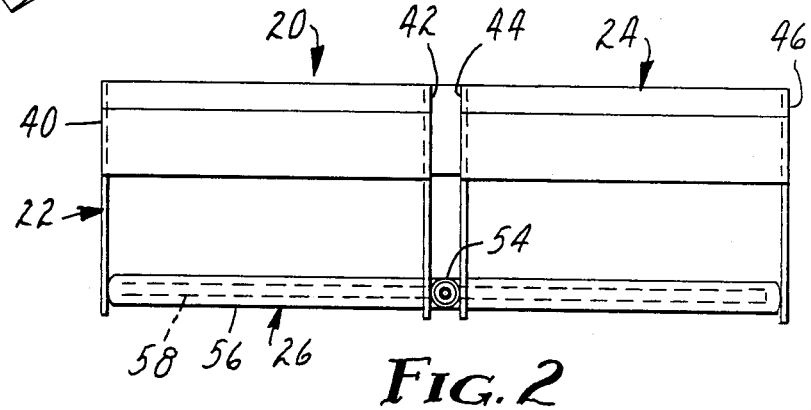
Fig. 2
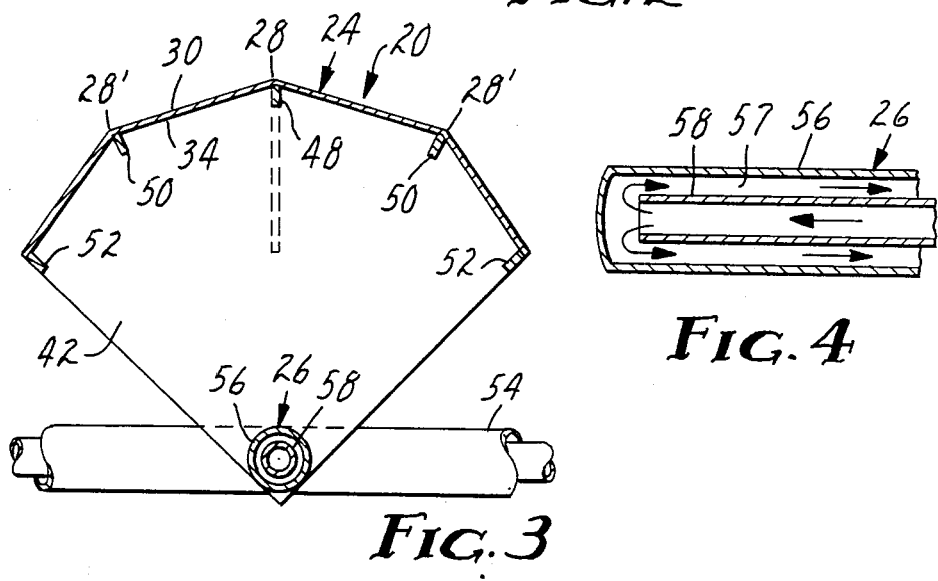
Fig. 3
Fig. 4

REFRACTING SOLAR ENERGY CONCENTRATOR AND THIN FLEXIBLE FRESNEL LENS

This is a continuation of application Ser. No. 169,004 filed Mar. 16, 1988, abandoned, which is a continuation of application Ser. No. 774,048 filed Sept. 9, 1985, now abandoned.

FIELD AND BACKGROUND OF THE INVENTION

The present invention relates to an improved light weight solar energy concentrator and in one aspect to an improved thin flexible Fresnel-type lens for focusing solar radiation incident on the lens' outer surface onto a target area by refraction.

The concept of utilizing solar energy is not new. One of the earliest references in literature to the use of solar energy is made in Aristophanes' "The Comedy of the Clouds", which was performed in 434 B.C. In this play, one of the characters, Strepsiades, declares that he will destroy a was tablet record of a debt by using the sun and a glass lens to melt away the writing. In order for this remark to be appreciated by the theater-going public, it must have been common knowledge that the rays of the sun could be focused to generate heat. In addition, Lactantius, in 303 A.D. stated that a glass globe filled with water and held in the sun would start a fire on even the coldest day. Further, an entry in the inventory of the vestry of West Minster Abbey dated 1388 records the kindling of the "new fire" on Easter Eve with a "burning glass", and in 1745, the French scientist, Buffon, conducted experiments in generating high temperatures by concentrating the suns's rays.

Solar energy is especially attractive today, in this age of diminishing fossil fuels in which the public's awareness of atmospheric pollution and apprehension of nuclear energy has encouraged the development of alternative energy sources. Solar energy, as such an alternative, is inexhaustible and pollution free. A few of the present applications of solar energy that have evolved are the generation of electricity with photovoltaic cells, as illustrated in U.S. Pat. No. 4,204,881, distillation of water, as illustrated in U.S. Pat. No. 4,270,981, "cool" lighting for buildings, as illustrated in U.S. Pat. No. 4,297,000, and the accumulation and storage of heat, as illustrated in the below referenced patents. However, several problems have been encountered in attempting to devise an efficient, economical and practical means of concentrating this abundant enery source.

Several systems have been devised or proposed over the years in an attempt to concentrate or collect solar energy as a practical alternative to other forms of energy. Generally, there have been three types of solar concentrators or collectors proposed, namely, those employing mirrors, lenses, or a combination of both.

For example, one such system has utilized concave, parabolic mirrors in the form of a large dish, as illustrated in U.S. Pat. No. 4,111,184. In addition, other systems have utilized reflective troughs, as illustrated in U.S. Pat. Nos. 4,385,430 and 4,211,211, or an array of concentric annular conic frusta, as illustrated in U.S. Pat. No. 4,347,834. Further, a system has used flat mirrored surfaces as illustrated in U.S. Pat. No. 4,344,417 as well as flat fresnel mirrors, as illustrated in U.S. Pat. No. 3,058,394.

The reflective trough appeared to offer the best potential for high concentration of solar energy. However, this goal was seldom, if ever, achieved because of the precision required in the curvature of the reflective surface where any angular change at any point from the prescribed surface resulted in a two fold deviation of the reflected solar radiation. In addition, vibration of the reflecting surface could not be tolerated. The need to maintain the accuracy and steadiness of the reflecting surface over long periods of time required that the reflector be constructed of very rigid materials and be carefully aligned. Thus, a heavy and massive supporting structure was required. In addition, this massive structure had to be mounted so that it would remain vibration-free while tracking the sun in diurnal motion. Further, such structures have not been proved adaptable or feasible for use in space where weight reduction is of monumental importance.

In an attempt to overcome some of the limitations of the above reflective structures, refractive lenses have been utilized. Examples of Fresnel-type lenses used to concentrate solar energy are illustrated in U.S. Pat. Nos. 4,289,118; 4,194,949; and 4,011,857. In addition to the above, such lenses have also been utilized in the form of flat Fresnel lenses, as illustrated in U.S. Pat. Nos. 3,985,118 and 3,203,306, convex Fresnel lenses, as illustrated in U.S. Pat. No. 4,116,223, semi-cylindrical or tubular, as illustrated in U.S. Pat. Nos. 4,299,201 and 3,125,091, or a linear array of refracting Fresnel elements, as illustrated in U.S. Pat. No. 4,069,812.

Several limitations have been associated with the utilization of such lenses. In situations where flat Fresnel lenses have been used, they have resulted in limited apertures because of excessive chromatic aberration near the edges of the lenses. Arcuate shaped lenses have attempted to overcome this limitation but because of the need to maintain the desired configuration they have had to be constructed of a rigid material or required a complex support system. In any event, the above lens structure, like the mirror structures, has not proved adaptable or feasible for use in space where light weight construction and ease of deployment without precision alignment are of monumental importance.

Lastly, a combination of refracting lenses and reflecting mirrors have been utilized to concentrate solar energy in an attempt to overcome the above limitations, an example of which are illustrated in U.S. Pat. Nos. 4,337,759; 4,238,246; and 4,022,186. Additionally, a refracting lens and reflecting trough combination have been utilized, as illustrated in U.S. Pat. Nos. 4,323,052 and 4,230,094. However, these structures are rigid in an attempt to maintain their configuration or shape.

The present invention affords an improved light weight refracting solar energy concentrator and thin flexible Fresnel-type lens which achieves and maintains high operational efficiencies with minimal weight and substantially reduced manufacturing cost. In addition, because of the structures simplicity of construction, it can easily be deployed in space. Further, notwithstanding such simplicity of construction and its compactness, distortion of the refracting surface will not materially affect the efficiency of the concentrator, rendering the concentrator particularly advantageous for use in space.

SUMMARY OF THE INVENTION

The invention described herein contemplates an improved solar energy concentrator, specifically, one in which a thin flexible Fresnel-type lens focuses incident solar radiation onto a target area by refraction. In addition, the Fresnel lens is supported or suspended above the target area and folded along at least one line or region parallel to the refractive prisms of the lens which are generally parallel to the axis of the target area whereby the Fresnel lens opens toward the target area. Further, the efficiency of the concentrator is not materially affected by distortion of the Fresnel lens when refraction by the thin film is substantially at minimum deviation. Thus, the Fresnel lens is positioned above the target area so as to allow that portion or section of the lens between the folds to bow and flex under wind loads, gravity and other environmental factors without causing a significant deterioration in the efficiency of the system even though the surface of the Fresnel lens may bow in and out from a planar position as much as 5° or more. The degree of bowing is conveniently measured as the angle between the plane in which the thin Fresnel lens should lie and the tangent to the curve of the bow at the point of support.

The material of which the Fresnel lens consists is essentially a smooth flexible transparent polymeric material having a smooth surface and an opposite surface consisting of a plurality of miniature linear Fresnel prisms or lenticular elements arranged side by side wherein the smooth surface effectively forms one of the optical faces of each prism. In addition, each prism includes an optical face which is intended to redirect the light. Each prism also has a nonactive optical face or step which does not block or interfere with the directed solar radiation. Thus, the prisms in the film are arranged such that the steps defined by the prisms do not interfere with the refraction of the incident solar radiation. Further, in the preferred embodiment, the Fresnel lens is oriented so that the more fragile Fresnel prism will not be directly exposed to hail, rain or other destructive environmental elements.

The support structure which suspends the Fresnel lens above the target area consists of struts or wires defining the aperture of the solar concentrator, and the Fresnel lens is suspended on the struts or wires under slight tension. A center support extends along the center of the Fresnel lens and is preferably removably supported by a spring biased shock absorber to apply a small force to the thin film to place it under a small but constant tension and to dampen severe repeated undulations. In this configuration, the Fresnel lens can deflect under air pressure to maintain an acceptable performance.

The target area upon which the solar radiation is focused can be black, opaque, translucent, or transparent and either pipes for transferring an absorptive medium, or photovoltaic cells, etc. from which energy can be taken.

DESCRIPTION OF THE DRAWINGS

The various features, objects, benefits and advantages of the present invention will become more apparent by reading the following detailed description in conjunction with the drawings where like reference numerals identify corresponding components:

FIG. 1 is a perspective view of a solar energy concentrator constructed in accordance with the present invention;

FIG. 2 is a side elevational view of the solar energy concentrator of FIG. 1;

FIG. 3 is a vertical cross-sectional view of the solar energy concentrator taken in the direction of arrows 3—3 of FIG. 1;

FIG. 4 is a fragmentary vertical cross-sectional view of the target or absorber of the solar energy concentrator;

DETAILED DESCRIPTION OF THE PREFERRED EMBODIMENT

Figure 5:
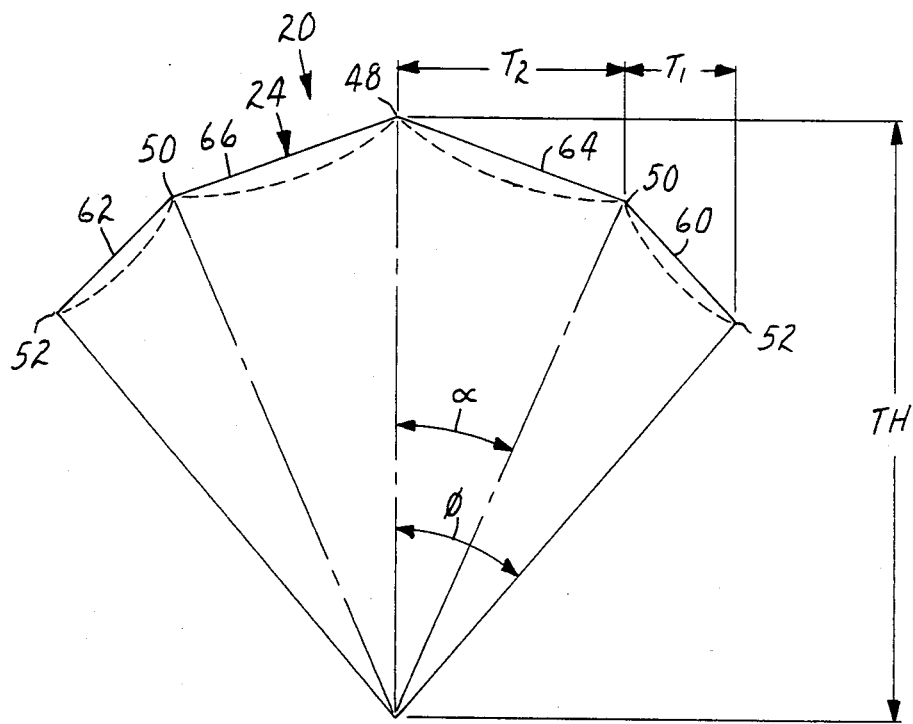
FIG. 5 is a schematic diagram of the thin flexible Fresnel lens of the solar energy concentrator.

Referring to FIGS. 1, 2 and 3 of the drawings, the solar energy concentrator of the present invention, generally designated 20, includes a lightweight support structure or frame 22 and a linear echelon Fresnel-type lens 24 for focusing incident solar radiation onto a target area or absorber 26. It is contemplated that the lens 24, which in this invention is a thin, limply flexible, transparent film, be folded at an acute angle to incident solar radiation (not normal) along at least one line or region 28 parallel to the refractive prisms of the lens which are generally parallel to the axis of target area 26 and the film is suspended, drapped or mounted upon the support structure 22 to open toward target area 26. The efficiency of concentrator 20 is not materially affected by distortion of lens 24. For illustration purposes only, a solar energy concentrator 20 is depicted wherein the lens 24 is folded along three lines 28. It must be appreciated that the width and height (and corresponding focal length) of any given concentrator is a matter of choice dependant upon the given circumstances and the number of folds may therefor vary.

Figure 5A:
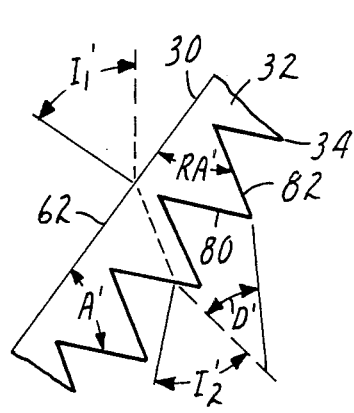
FIG. 5A and 5B are enlarged diagrammatic sectional views of the lens of FIG. 5 taken at spaced points of the lens of FIG. 5.
Figure 5B:
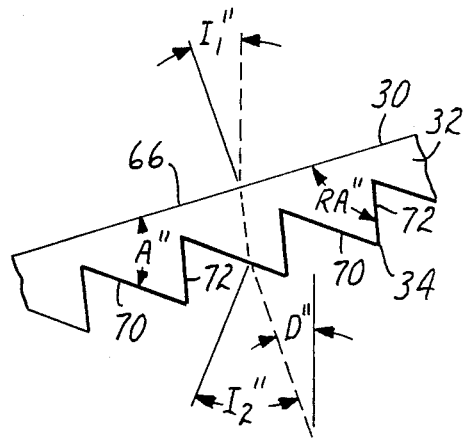

The lens 24 consists of a thin, limply flexible, transparent sheet of polymeric material, for example, polymethylmethacrylate, having a smooth surface 30 on one side and a plurality of miniature linear Fresnel prisms 32 extending lengthwise and arranged side by side to form the opposite or second surface 34, as illustrated in FIGS. 5A and 5B. The thin lens film 24 is very flexible and about 0.015 inch thick. The thin flexible fresnel lens 24, in a preferred embodiment, is positioned so that the smooth surface 30 is toward the sun, and the opposite surface 34 is toward target area 26 to prevent the prisms 32 from being directly exposed to hail, rain and other destructive environmental elements. In addition, because the film is easy to install, it can be conveniently replaced when soiled and/or damaged by the deleterious effects of the atmosphere and the elements. The prisms 32 on the film are arranged in such a manner that loss due to step interference caused by the nonactive face of the prisms is not in the way of light rays refracted by the optically active face of the prisms which is intended to bend the light toward the focus.

The lens 24 is supported such that it is allowed to bow or flex transversely, axially or lengthwise to move toward and away from target area 26. The degree of bowing is conveniently measured as the angle between the plane in which the thin Fresnel lens should lie and the tangent to the curve of the bow at the point of support, and the surface may bow in and out as much as 1°, 2°, 5° or more, without materially affecting the image quality of the lens. As used herein, a negative bow of −1° or −2° would mean the lens would bow away from the target area, and a positive bow of +1° or +2° is toward the target area. It is also contemplated that one section or multiple sections located between the transversely placed supports may be used individually or in combination as a solar energy concentrator.

The design of the illustrated embodiment of FIG. 3 utilizes a thin flexible Fresnel lens film sheet 24 with the lens folded about the center 28 of the solar concentrator aperture and by another fold 28' on each side of the lens inward from the edge of the lens. These folds, one at the center 28, together with the two additional folds at 28', serve to minimize the deleterious effect of bowing as well as undulations in the thin, flexible Fresnel lens film. In addition, step losses due to some of the refracted light being blocked by adjacent prisms is minimized, and further, the spread of the focused image due to chromatic aberration is also minimized. All of which would make a flat Fresnel lens of the same aperture unacceptable. Folding the lens on each side of the center will also make a more compact lens design. In focusing the incident solar radiation onto the target area or absorber 26 the rays at the outer periphery of the concentrator of solar energy are bent the most. These rays, therefore, are affected the most by aberrations. Therefore, the design parameters of the discrete array of linear Fresnel prisms is based on a Fresnel prism, at or substantially close to the periphery of the concentrator designed so that the angle of incidence of the solar radiation is equal to the angle of emergence of the same ray after refraction. This results in minimum deviation of that ray for that particular Fresnel prism making the lens 24 performance insensitive to bowing, rotation or distortion. Therefore, the fold is positioned at the point where the exit ray from the lens becomes substantially perpendicular to the Fresnel prism's optical face on the surface panel. The portion of the lens extending from the fold to the center is preferably positioned at an angle such that bowing will not expand the solar image any more than the periphery section or sections sufficient to materially effect the efficiency of the concentrator. It is generally preferred to maintain the angles for the smooth incident surfaces of the lenses such that the angle of incidence does not exceed 60° because the loss due to Fresnel reflections at the surface will exceed 10% with such high angles of incidence.

In the illustrated embodiment a support structure or frame 22 includes four hexagonally sided end pieces 40, 42, 44 and 46. Extended between pairs of end pieces are center struts 48, intermediate fold struts 50 and edge struts 52. These struts extend lengthwise of the frame 22 and the end plates 40, 42, 44 and 46 are mounted on the absorber 26 which extends the length of the solar concentrator 20.

The target area or absorber 26, depending upon the particular application, may include a pipe with a heat absorbing fluid medium, photo-voltaic cells, etc. In the illustrated embodiment in FIGS. 3 and 4 an absorber 26 is depicted having an outer pipe 56 and an inner feeder pipe 58. Outer pipe 56 may have a translucent surface exposing a heat transfer fluid 57 within the absorber to the sunlight. The heat transfer fluid flows through the inner pipe 58 to the end of the absorber pipe 56 and then after being heated by exposure to the focussed solar radiation to a main pipe 54 extending between sets of solar concentrators 20. A solar power system utilizing photo-voltaic cells is illustrated in U.S. Pat. No. 4,204,881, the disclosure of which is hereby incorporated by reference.

FIGS. 5, 5A and 5B show a specific design for a solar concentrator 20 having the desired characteristics for a unit aperture, and where the first sections of the lens indicated at 60 and 62 are disposed such that the angle of incidence $I_1'$ for this angled steeped side is 45° and has a length from the marginal edge 52 to the support 50 of 0.29 units. The selection of the designation "units" is arbitrary for illustrative purposes only, any unit of measure may be utilized, for example, meters, feet, inches, etc. On this lens the angle $\phi$ made by strut 48 to edge strut 52 from the focal point of the solar concentrator 20 is 33.46°, and the angle $\alpha$ from strut 48 to the second support strut 50 is 17.11°. The angle of incidence of the light with sections 64 and 66 of the solar concentrator are 13.75°, indicating an angle $I_1''$ in FIG. 5B, equal to 13.75°. The distance TH from the focal point to the center of the solar collector is 1.03 units. As indicated in FIG. 5B, the solar collector 20 in the area 66, corresponding to area 64, has a smooth outer surface 30 and the Fresnel prisms 32 form the opposite face 34. The Fresnel prisms 32 have an optically active face or surface 70 and an inactive riser, face or surface 72. The angle between the optical face 70 and the smooth surface 30 is the angle $A''$, and the angle between smooth surface 30 and the inactive surface is the angle $RA''$. The angle of the refracted ray leaving the optical face 70 is indicated for this section by the angle $I_2''$, giving an angle of deviation $D''$. As illustrated in FIG. 5A, in the area 62, which would correspond to the area 60, the angle of incidence is indicated $I_1'$, and the exit angle, is $I_2'$ with an angle of deviation $D'$. The angle of the optically active face 80 would be the angle $A'$, and for the inactive adjacent connecting face 82 would be the angle $RA'$.

The disclosed equations are for exemplary purposes only and are not essential to the present invention. A number of alternative equations are well known to those skilled in the art or they may easily derive them or similar ones from Snell's Law of refraction and the rules of trigonometry, as, for example, disclosed in U.S. Pat. No. 4,069,812, the disclosure of which is hereby incorporated by reference. Thus, the parameters utilized in determining the design of the illustrated lens are as follows:

(1) If a ray of light (from the sun) strikes the first surface of the folded Fresnel lens at an angle of incidence I, then the condition of miminum deviation determines the angle A that the second surface of the lens must make to the first, and that the angle of minimum deviation is $D_m$:

$$D_m = 2(I - \sin^{-1}(\sin(I/n)))$$

where n is the index of refraction of the material.

(2) The active face angle A of the lens, necessary to produce a given angle of deviation D, including the minimum deviation is:

$$A = \tan^{-1}\left(\frac{\sin(D-I) + \sin(I)}{(n^2 - \sin^2(I))^{\frac{1}{2}} - \cos(D-I)}\right)$$

(3) The riser between active optical faces of the lens will not intercept any light if it is positioned between the extreme rays from one side of the sun, having suffered only refraction at the first surface, and the extreme rays from the other side of the sun having suffered refraction at both lens surfaces. That is between the internal and the external rays. These rays become parallel and thus define a critical point on the lens when the internal and the external rays make an angle of RA to the first surface given by:

$$RA = \cos^{-1}(\sin(I-s)/n)$$

where s is half the angle the sun subtends at the lens (approximately ¼ degree).

Figures 6, 8:
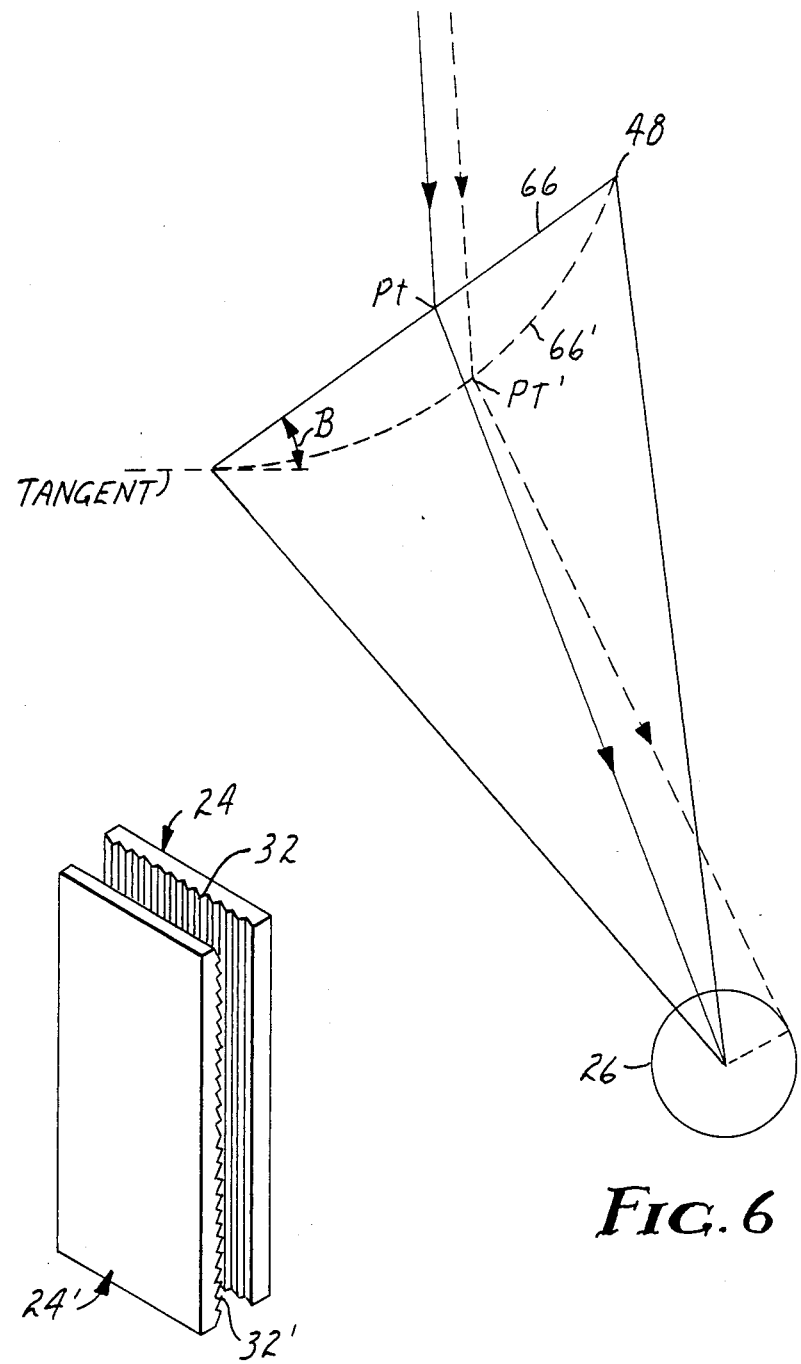
FIG. 6 is a diagrammatic view showing the relationship of the rays through the solar energy concentrator illustrating refraction by an element of the concentrator of the present invention.
FIG. 8 is a perspective representation of a crossed, linear echelon refractor lens of the present invention for point focusing incident solar radiation.

(4) When a thin Fresnel lens is subjected to distortion, the surface is displaced and rotated, as illustrated in FIG. 6, where the solid line 66 and point of incidence, Pt, represent an undisturbed condition, and the broken line 66' and point of incidence, Pt', represent a bowed condition. For practical lenses of the kind discussed here, the rotation produces by far the greatest effect and is considered for the design although both effects are taken into account in the analysis. If r is the rotation of a portion of the lens (less than or equal to the bow B) where the angle of the second surface to the first is A and the angle of incidence in the absence of rotation is I, the resulting angle of deviation of the light is D:

$$D = -A + I + r + \sin^{-1}(n \sin(A - \sin^{-1}(\sin(I+r)/n)))$$

Figure 7A:
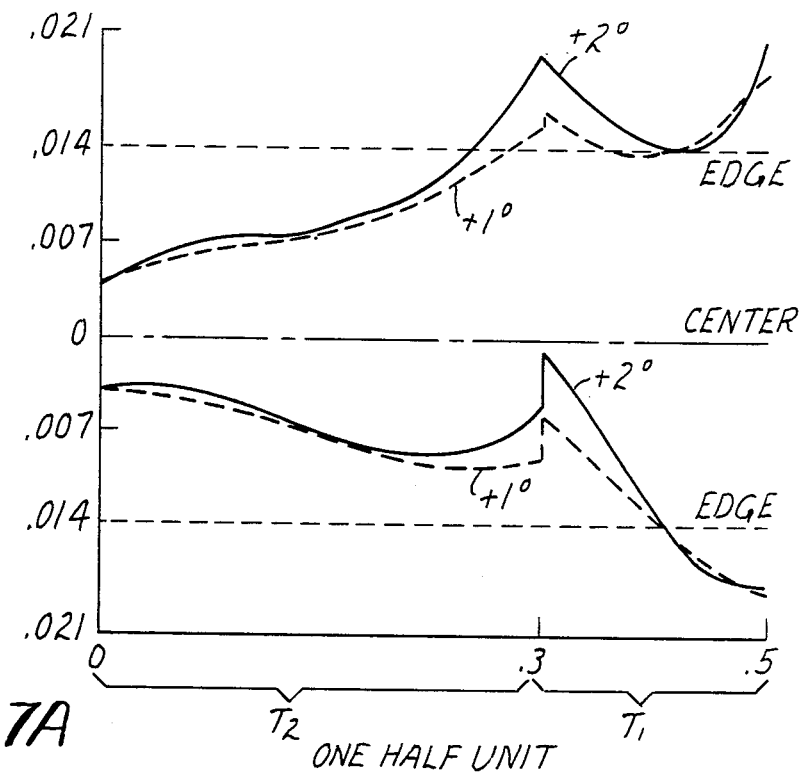
FIG. 7A is a chart showing the width of the image of the sun as a function of prism position (including chromatic aberration from 400 nm to 1000 nm) at +2° bow (solid line) and +1° bow (broken line)
Figure 7B:
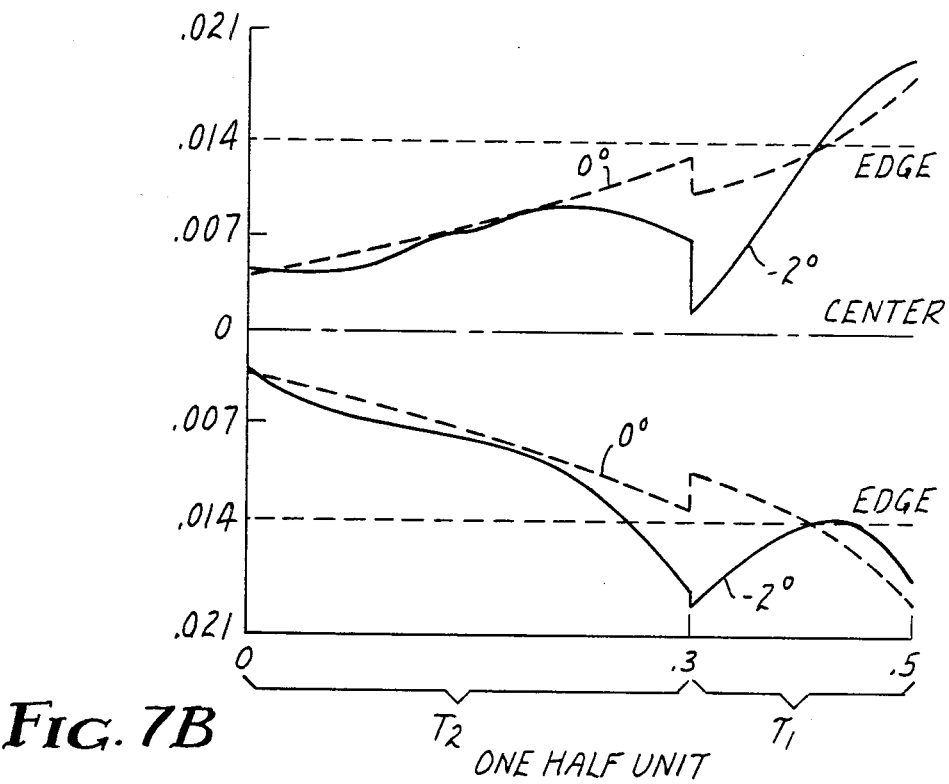
FIG. 7B is a chart showing the width of the image of the sun as a function of prism position (including chromatic aberration from 400 nm to 1000 nm) at −2° bow (solid line) and 0° bow (broken line)

Utilizing these formula, the lens of the illustrated design is such that the active lens faces 70 and 80 of the Fresnel prisms 32 direct light sufficiently close to the target area 26 as illustrated by the graph of FIGS. 7A and 7B, such that a minimum amount of the solar energy is lost even with a wind tending to bow the surface of the lens such that the lens may still be made of thin films, and require less weight for the total solar energy concentrator. Some representative steps for the lens of the present invention are given in the following table wherein the numbers under $S_1$ and $S_2$ equal the distances from the center of the solar concentrator to the prism where one unit is the total aperture of the entire solar concentrator. $S_1$ represents the distances within aperture $T_1$ and $S_2$ representing distances within aperture $T_2$. $T_1$ is the aperture of sections 60 and 62, and $T_2$ is the aperture of sections 64 and 66. The ratio of the lens aperture $T_2$ to $T_1$ is equal to 1.45, the index of refraction of the material is 1.493 and $I_1' = 45°$ and $I_1'' = 13.75721°$. RA' represents the minimum riser angle for this lens design which is 61.86545° and RA'' is 80.99957°. However, it should be appreciated that the riser angle may increase for Fresnel prisms outboard of the critical riser angle.

TABLE T₁

| $S_1$ | A' | $I_2'$ | D' |
|---|---|---|---|
| .5000 | 56.5384 | 45 | 33.4616 |
| .4720 | 53.5360 | 39.5880° | 31.0520 |
| .4445 | 50.2010 | 33.8927° | 28.6917 |
| .4165 | 46.5696 | 27.9565° | 26.3869 |
| .3890 | 42.6990 | 21.8419° | 24.1429 |
| .3610 | 38.6647 | 15.6286° | 21.9639 |

TABLE T₁-continued

| $S_1$ | A' | $I_2'$ | D' |
|---|---|---|---|
| .3335 | 34.5549 | 9.4080° | 19.8531 |
| .3055 | 30.4620 | 3.2748° | 17.8128 |
| .2960 | 29.0493 | 1.1648° | 17.1155 |

TABLE T₂

| $S_2$ | A'' | $I_2''$ | D'' |
|---|---|---|---|
| .2960 | 31.9275 | 35.2858 | 17.1155 |
| .2780 | 30.3464 | 32.6461 | 16.0569 |
| .2500 | 27.7576 | 28.4256 | 14.4252 |
| .2220 | 24.9984 | 24.0037 | 12.7925 |
| .1945 | 22.0640 | 19.4681 | 11.1613 |
| .1665 | 19.0049 | 14.7820 | 9.5343 |
| .1390 | 15.8467 | 10.0036 | 7.9141 |
| .1110 | 12.6284 | 5.1744 | 6.3032 |
| .0835 | 9.3927 | .3396 | 4.7041 |
| .0555 | 6.1826 | −4.4555 | 3.1191 |
| .0000 | 0.0000 | −13.7572 | 0.0000 |

FIG. 7A shows the position of the solar image on the target area or absorber whose width is 0.028 as a function of $S_1$ and $S_2$. Shown is one half of the full aperture of the solar concentrator. This half is equal to one-half unit. The half aperture is divided into parts $T_1$ and $T_2$. The solid line indicates the spread of the image including chromatic aberration due to a bow of +2°, and the broken line shows the spread of the image including chromatic aberration due to a bow of +1°. FIG. 7B shows the spread of the image including chromatic aberration for a bow of −2° (solid line), and the broken line shows the spread of the image including chromatic aberration when the thin flexible Fresnel lens 24 is in its flat, normal position, without bow. This image deterioration is acceptable.

In order for the solar energy concentrator of the present invention to operate efficiently throughout the daylight hours, it will be necessary to track the sun across the sky, thereby keeping the lens 24 always pointing in the direction of the sun. Thus a tracking means (not shown) of the type for example disclosed in U.S. Pat. Nos. 4,352,350; 4,347,834; and 4,089,323, the disclosures of which are hereby incorporated by reference, may be attached to concentrator 20. Thus, the selected tracking means may be utilized in accordance with three tracking schemes, depending upon the application requirements, as described in U.S. Pat. Nos. 4,069,812 and 4,011,857, the disclosures of which are incorporated herein by reference.

The concentrator of solar energy of this invention can also be designed to focus the radiant energy onto a target or absorber which has a very small area and is essentially a spot or point. The sheet or lens 24 structured on one side with linearly arrayed discrete fresnel prisms 32 can be placed into close contact with another sheet or lens 24' also structured on one side with an array of special discrete linear Fresnel prisms 32' disposed perpendicular to the first sheet 24, as illustrated in FIG. 8. Or the first sheet can be structured on both sides. Another configuration consists of a structured sheet formed into a frustum and then topped with another sheet formed into a cone having a different angle than the frustum. This assembly of structured sheets will also focus the solar radiation onto a very small area, essentially a spot. The sheet of linearly arrayed Fresnel prisms can also be cut into pie shaped triangles and fitted together to form a pyramid which configuration will also focus the incident solar radiation onto a spot.

Having thus described the present invention it is appreciated that the specific design of the lens and the path of the light through the lens is determined by the angle of the steps of the lens, all of which are contemplated without departing from the present invention. The more compact and efficient designs for the lenses are found when the angle of incidence of the sun's rays to the Fresnel lens is essentially equal to the angle of the exit ray to the Fresnel active face at or near the edge of the lens. This is not always required, and some cases may not even be desirable, but it is noted that this is where the more compact and most efficient concentration is found.

In another embodiment the long narrow target is an absorber pipe so constructed that the liquid heated by solar radiation leaves through the center of the absorber which consists of a pipe within a pipe. Because the unit is light weight it can be employed in most locations, especially where massive, cumbersome units are not suited. Because, in one embodiment, it can be rolled up into a small package it is especially well adapted for use in space. After the vehicle has been launched and is in orbit the solar concentrator, of this invention, can be automatically deployed. Precision alignment is not necessary for efficient operation.

While a preferred embodiment of the present invention has been described so as to enable one skilled in the art to practice the techniques of the present invention, the preceding description is intended to be exemplary and should not be used to limit the scope of the invention. The scope of the invention should be determined only by reference to the following claims.

What is claimed is:

1. A solar energy concentrator comprising:
   a target area;
   lens means including a sheet of thin flexible transparent polymeric film having a first surface and a second surface, and having a plurality of lenticular light refracting prisms forming said second surface for refracting incident solar radiation striking said lens means at an acute angle to said lens means;
   support means for supporting said lens means above said target area and said lens means being mounted upon said support means to open toward said target area whereby said lens means is folded at at least one line parallel to said lenticular light refracting prisms to define at least two sections, and said light refracting prisms being defined for focusing said incident solar radiation onto said target area whereby the efficiency of the concentrator is not materially affected by image deterioration at said target area due to bowing of said sections of said lens means during use.

2. The solar energy concentrator defined in claim 1 wherein said film is folded along at least one line parallel to the axis of said target area.

3. The solar energy concentrator defined in claim 1 wherein said target area includes at least one pipe for transferring an absorptive media.

4. The solar energy concentrator defined in claim 1 further comprising a second lens means having a smooth surface and an opposite surface; said opposite surface formed of a plurality of lenticular light refractive means for focusing incident solar radiation striking said film, onto said target area; and said support means is adapted for additionally supporting said second flexible film above said target area whereby said incident light striking said lens means and said second lens means is point focused onto said target area.

5. The solar energy concentrator defined in claim 1 wherein said first surface comprises a plurality of lenticular light refracting prisms for focusing incident solar radiation striking said film onto said target area, whereby said incident light is point focused.

* * * * *

UNITED STATES PATENT AND TRADEMARK OFFICE
CERTIFICATE OF CORRECTION

PATENT NO. : 4,848,319

DATED : July 18, 1989

INVENTOR(S) : Roger H. Appeldorn

It is certified that error appears in the above-identified patent and that said Letters Patent is hereby corrected as shown below:

On the cover page, Section entitled "Related U.S. Application Data", should read -- Continuation of Ser. No. 169,004, Mar. 16, 1988, abandoned, Continuation of Serial No. 774,048, Sep. 9, 1985, abandoned. --

Signed and Sealed this

Twenty-seventh Day of November, 1990

Attest:

HARRY F. MANBECK, JR.

*Attesting Officer*   *Commissioner of Patents and Trademarks*